United States Patent [19]

Fischer et al.

[11] Patent Number: 4,483,433
[45] Date of Patent: Nov. 20, 1984

[54] APPARATUS FOR THE FEEDING AND REMOVAL OF WORKPIECES TO AND FROM WORK STATIONS COUPLED IN PARALLEL

[75] Inventors: Bruno Fischer, Dietikon; Angelo Andretta, Urdorf; Manfred Nussbaumer, Dietikon, all of Switzerland

[73] Assignee: Micafil AG, Zurich, Switzerland

[21] Appl. No.: 339,083

[22] Filed: Jan. 13, 1982

[30] Foreign Application Priority Data

Jan. 22, 1981 [CH] Switzerland .............................. 40481

[51] Int. Cl.³ ........................................... B65G 47/00
[52] U.S. Cl. ..................................... 198/339; 198/372
[58] Field of Search ............... 198/339, 341, 358, 370, 198/486, 345, 448, 447, 442, 372, 690; 29/596

[56] References Cited

U.S. PATENT DOCUMENTS 2,029,558 2/1936 Chalmers ........................... 198/370
2,711,817 6/1955 Hautau et al. ...................... 198/339

FOREIGN PATENT DOCUMENTS 1551065 8/1979 United Kingdom ................ 198/486

Primary Examiner—Joseph E. Valenza
Assistant Examiner—Kyle E. Shane
Attorney, Agent, or Firm—Burns, Doane, Swecker & Mathis

[57] ABSTRACT

Apparatus for feeding and removing work pieces to and from first and second work stations coupled in parallel comprises first and second transporters for transporting work pieces to and from the first and second work stations, respectively; and a transfer system for each of the work stations for transferring work pieces from the first transporter to the corresponding work station and from the corresponding work station to the second transporter. Each of the transfer systems comprises a displaceable work piece receiver disposed in a first position thereof in alignment with the first and second transporter such that work pieces being transported by the transporters can pass through the work piece receiver.

8 Claims, 3 Drawing Figures

APPARATUS FOR THE FEEDING AND REMOVAL OF WORKPIECES TO AND FROM WORK STATIONS COUPLED IN PARALLEL

FIELD OF THE INVENTION

The present invention relates in general to apparatus for transferring workpieces to and from production machines, and in particular to apparatus for transferring workpieces to and from at least two electrical stator winding machines coupled in parallel.

BACKGROUND OF THE INVENTION

Feeder apparatus for transferring workpieces to and from electrical stator winding machines forming a production line is disclosed in German Patent DE-OS No. 27 19 229 wherein separate feeding and discharge devices feed and, after a separate work step, discharge workpieces from the respective winding machines as needed. A disadvantage of this apparatus is that the feeding step takes a relatively long time, which reduces the capacity of the winding machines which are coupled together, e.g., in parallel, and possibly reduces the capacity of the entire production line, which as a rule is determined by the capacity of the individual winding machines.

SUMMARY OF THE INVENTION

It is therefore the object of the present invention to provide apparatus for transferring workpieces to and from work stations which are coupled in parallel and which do not operate on predetermined cycles with a minimum of idle time.

The object is achieved in accordance with the present invention by apparatus comprising a first transporter for transporting workpieces to first and second work stations; a second transporter for transporting workpieces from the first and second work stations; a transfer device for each of the work stations for transferring workpieces from the first transporter to the corresponding work station and from the corresponding work station to the second transporter. Each of the transfer devices comprises a displaceable workpiece receiver disposed in a first position thereof in alignment with the first and second transporters such that workpieces being transported by the first and second transporters can pass through the workpiece receiver. The apparatus of the present invention further comprises control apparatus for controlling the transport of workpieces by at least one of the transporters and the transfer of workpieces by each of the transfer devices.

In accordance with one aspect of the present invention, the transporters preferably comprise first and second conveyors on which workpieces are entrained by their own weight, and the first and second conveyors are disposed adjacent each other at least in the vicinity of each of the work stations. Further, each of the workpiece receivers defines first and second receiver units for cooperating with the first and second conveyors, respectively.

In accordance with a further aspect of the present invention, the control apparatus comprises a first displaceable barrier disposed adjacent the first conveyor for selectively blocking passage of workpieces to the corresponding workpiece receiver.

In accordance with still another aspect of the present invention, the receiver units are defined by first and second sets of spaced guide rails which are oriented parallel to the first and second conveyors, respectively. The sets of guide rails are aligned with the first and second conveyors, respectively, when the workpiece receiver is disposed in the first position thereof, and support a workpiece disposed within the first and second receiver units, respectively, when the workpiece receiver is in a position vertically higher or transversely displaced from the aforesaid first position.

In accordance with another aspect of the present invention, the workpiece receivers are displaceable vertically and transversely with respect to the first and second transporters by means of displacement apparatus preferably comprising pistons cooperating with guide rails. A workpiece displacement device for each transfer device is also advantageously provided to transfer workpieces into and out of the corresponding workpiece receiver units when the workpiece receivers are disposed in operative relationship with the corresponding work stations. Preferably, the displacement devices comprise permanent magnets for holding the workpieces and slides for displacing the permanent magnets axially with respect to the corresponding workpiece receivers.

It will be appreciated that the transfer apparatus of the present invention substantially reduces the idle time of work stations coupled in parallel because the feeding and removal operations overlap in time. In addition, the transporters cooperate with the workpiece receivers associated with production machines coupled in parallel to provide storage of the workpieces.

These and other features and advantages of the present invention will be disclosed in or apparent from the following detailed description of a preferred embodiment.

BRIEF DESCRIPTION OF THE DRAWINGS

The preferred embodiment will be described with reference to the accompanying drawings, in which.

DETAILED DESCRIPTION OF THE PREFERRED EMBODIMENT

Figure 1:
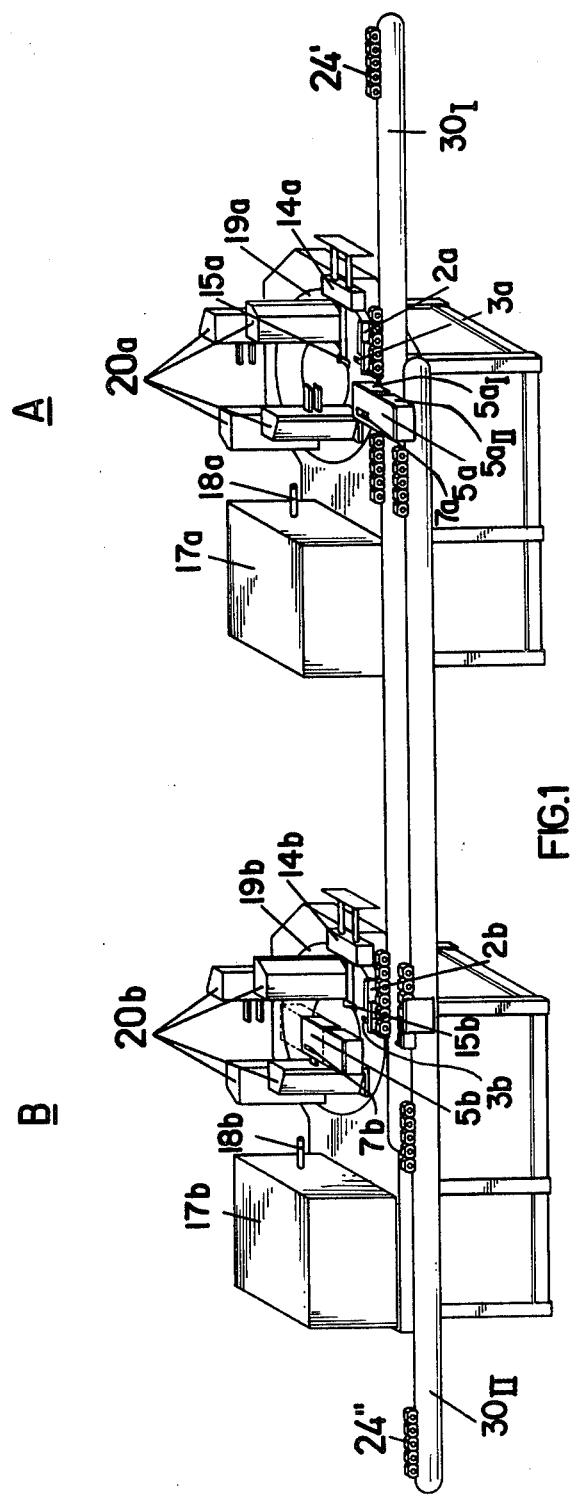
FIG. 1 is a simplified schematic perspective view of apparatus constructed in accordance with the present invention for use with two stator winding machines coupled in parallel.

The present invention will be described with reference to two work stations A and B of a production line which are coupled in parallel. The preferred embodiment illustrated in the drawings includes duplicate assemblies which are provided for each work station. The elements of these duplicate assemblies have been generally denoted in FIG. 1 by the same reference numerals, with the letter A and B added to indicate the corresponding work station. For the sake of clarity, only the reference numerals will be used in describing the duplicate assemblies hereinafter, except where a distinction is to be made in the operation of the assemblies.

Figure 2:
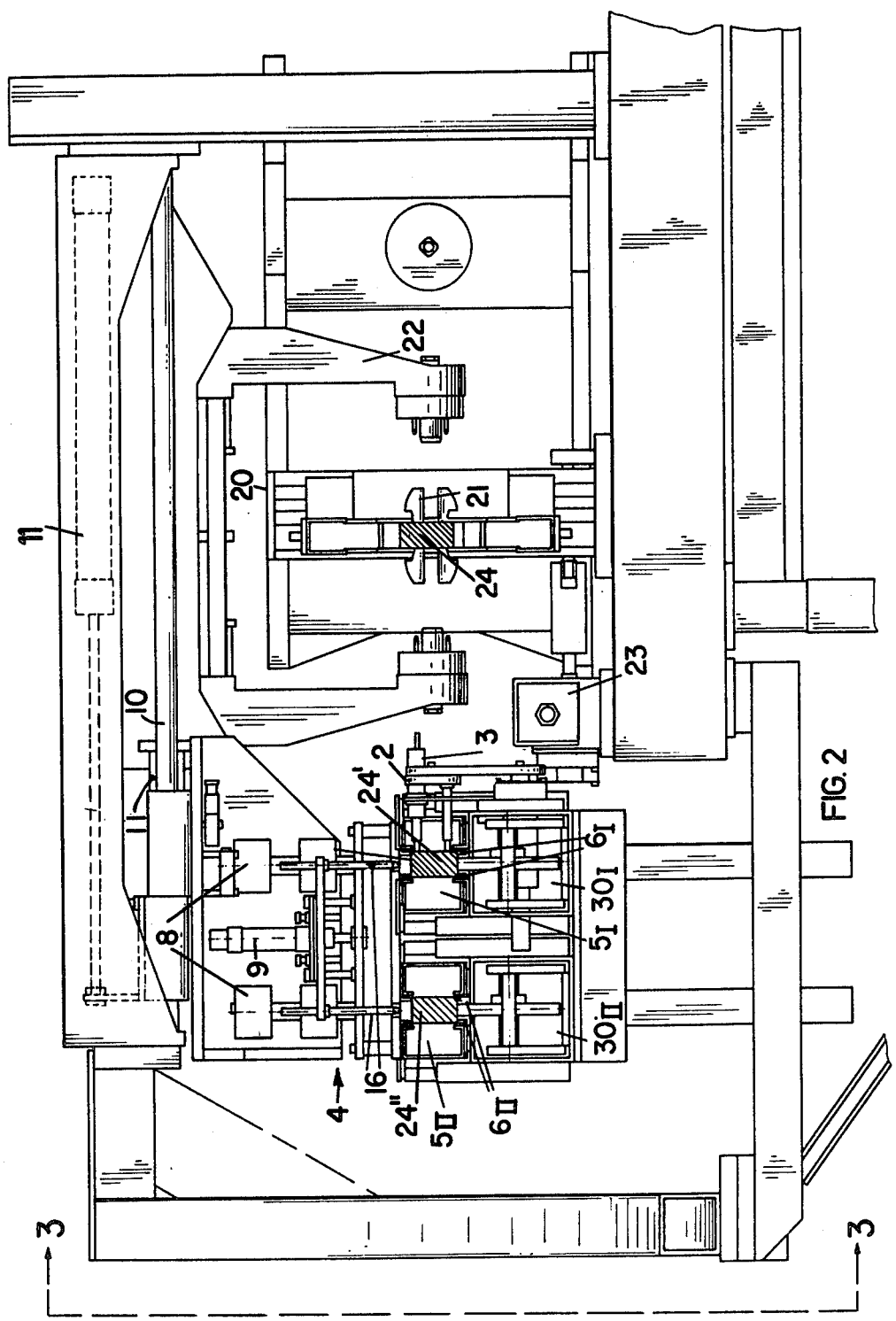
FIG. 2 is a front elevational view, partially broken away, of a portion of the apparatus shown in FIG. 1.

Referring to FIG. 1, each work station A and B advantageously comprises a stator winding machine 17 associated with a plurality of stator holding assemblies 20 mounted on a rotating table 19. Referring to FIG. 2, each winding machine 17 comprises winding forms 21, form mounts 22, and a rotating device 23 to unlock form mounts 22, as is conventional.

The feeding and removal apparatus of the present invention comprises first and second transport installations $30_I$ and $30_{II}$, which run adjacent winding machines 17 and parallel to each other at least in the vicinity of each winding machine 17. Transport installations 30 transport stator workpieces, generally denoted 24. Transport installation $30_I$ transports unwound stator workpieces 24' to winding machines 17, and transport installation $30_{II}$ transports wound stator 24" from winding machines 17. A conventional endless, independently driven, chain conveyor, preferably a roller flight conveyor on which workpieces 24 are entrained by their own weight, advantageously constitutes each transport installation 30.

The apparatus of the present invention further comprises, for each winding machine 17, a transfer system, generally denoted 4, for transferring stator workpieces 24' from transport installation $30_I$ to the corresponding winding machine 17, and for transferring stator workpieces 24" from the corresponding winding machine 17 to transport installation $30_{II}$. Each transfer system 4 comprises a displaceable workpiece receiver 5 which, in a first position thereof, is disposed in alignment with transport installations 30 such that workpieces 24 being transported by the transport installations can pass through the workpiece receiver. Each workpiece receiver 5 advantageously comprises first and second receiver units $5_I$ and $5_{II}$ which cooperate with the first and second transport installations $30_I$ and $30_{II}$, respectively.

The apparatus of the present invention also comprises control apparatus for controlling the transport of workpieces 24 by transport installations 30 and the transfer of workpieces 24 by each transfer system 4. The control apparatus comprises, for each winding machine 17, a conventional displaceable barrier device 2 which is responsive to control signals. A barrier device 2 is disposed adjacent each transport installation $30_I$ and $30_{II}$ for selectively blocking passage of workpieces to the corresponding workpiece receiver 5. The control apparatus further comprises a conventional counter 3, such as, for example, a photodetector counter, disposed downstream of each of the barrier devices 2 for transport installation $30_I$ for sensing the last workpiece entering the associated workpiece receiver unit $5_I$ after the associated barrier device 2 has been activated to block passage of workpieces; and a conventional control element 7, preferably a switch, disposed in each workpiece receiver unit $5_I$, $5_{II}$ for sensing the presence or absence of workpieces during the feeding and removal of workpieces to and from winding machine 17 and for counting the number of unwound and wound stators 24' and 24", respectively.

Figure 3:
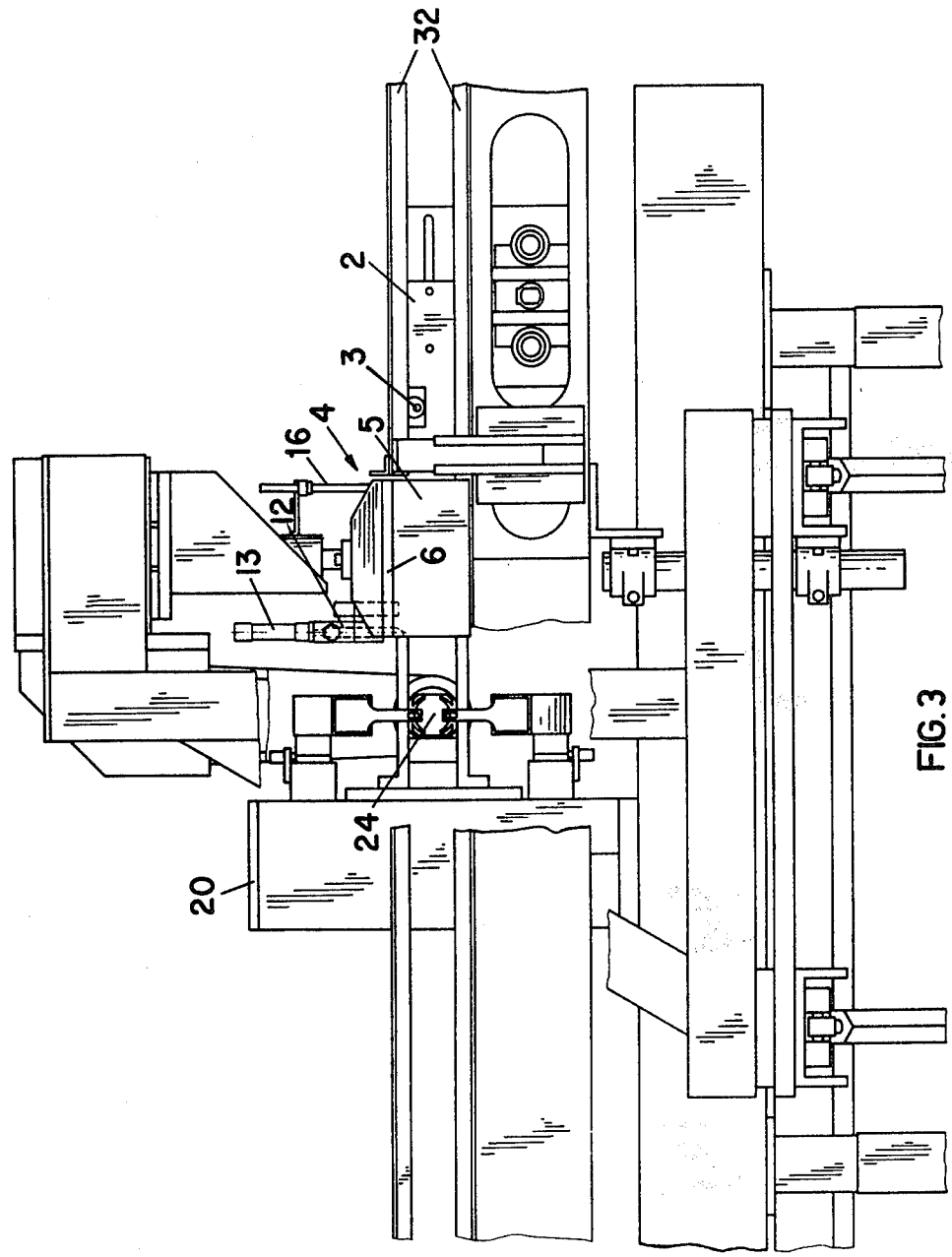
FIG. 3 is a side elevational view, partially broken away, taken along the line 3—3 of the apparatus illustrated in FIG. 1.

Referring to FIGS. 2 and 3, each workpiece receiver 5 advantageously comprises first and second sets of spaced guide rails $6_I$ and $6_{II}$ oriented parallel to transport installations 30 which define receiver units $5_I$ and $5_{II}$, respectively. The guide rails of each set $6_I$ and $6_{II}$ are aligned on either side of the corresponding transport installations $30_I$ and $30_{II}$, respectively, when the associated workpiece receiver 5 is disposed in the aforementioned first position thereof, such that workpieces can travel freely between the guide rails. As shown in FIG. 2, the workpieces 24 extend transversely beyond the lateral edges of each transport installation 30 such that the sets of guide rails 6 can lift workpieces disposed within the corresponding receivers 5 off transport installations 30 and support the workpieces when the corresponding receiver 5 is displaced to positions vertically higher than or transversely displaced from the aforesaid first position.

As shown in FIG. 3, each transport installation 30 advantageously comprises a set of guide rails 32 for maintaining the transverse position of the workpieces 24 being transported, and the workpiece receiver guide rail sets 6 advantageously form a segment of guide rails 32 when the corresponding workpiece receiver 5 is disposed in the aforementioned first position thereof.

As shown in FIG. 3, each transfer system 4 further comprises a displaceable stop member 12, which is actuated by a piston 13 responsive to the outputs of the corresponding counter 3 and control element 7, to arrest an unwound stator workpiece 24' within the associated workpiece receiver unit $5_I$ while the workpiece receiver 5 is in the first position thereof. It will be appreciated that such a stop member is not required for workpiece receiver unit $5_{II}$ since wound stator workpieces 24" are intended to be transported immediately to the next work station by transport installation $30_{II}$ when the workpieces are returned from the work station where they were wound.

Referring to FIG. 2, each transfer system 4 also comprises workpiece receiver displacement apparatus comprising a hydraulically actuated piston 9 cooperating with a set of vertically oriented parallel guide members 8 for vertical displacement of the associated workpiece receiver 5, and at least one hydraulically actuated piston 11 cooperating with a set of horizontally oriented parallel guide members 10 for transverse displacement of the associated workpiece receiver 5 into and out of the corresponding winding machine 17.

Referring to FIGS. 1 and 2, each transfer system 4 includes a unit, generally denoted 14, for inserting and removing workpieces into and from the associated winding machine 17 when the corresponding workpiece receiver 5 has been displaced into operative relationship with the winding machine. Each unit 14 advantageously comprises, as shown, a hydraulically actuated slide member equipped with a permanent magnet, generally denoted 15, which is disposed opposite the associated winding machine 17. Slide member 15 is actuated either to displace an unwound stator workpiece 24' from the corresponding workpiece receiver 5 into engagement with a stator holding assembly 20 when the workpiece receiver is positioned with the receiver unit $5_I$ thereof aligned between holding assembly 20 and slide member 15; or to displace a wound stator workpiece 24" from a stator holding assembly 20 into the corresponding workpiece receiver 5 when the workpiece receiver is positioned with receiver unit $5_{II}$ thereof aligned between holding assembly 20 and slide member 15. Each unit 14 advantageously further comprises vertically displaceable stripper elements 16 for engaging each stator workpiece 24' when it has been fed to the associated stator holding device 20, and each workpiece 24" when it has been returned to the associated workpiece receiver 5 by slide member 15 so as to separate the workpiece 24 from slide member 15 as it is withdrawn back to its rest position.

It will be appreciated by those of ordinary skill in the art that further conventional automatic control apparatus (not shown) is provided to synchronize the operation of the apparatus of the present invention with the operation of the winding machines in accordance with the mode of operation described hereinbelow.

The operating sequence of the apparatus of the present invention will now be described. It will be appreciated that the apparatus has been shown in FIGS. 2 and 3 with a workpiece receiver 5 in the aforementioned first position thereof just after a feeding/removal operation. Receiver unit $5_I$ is empty and the wound stator workpiece 24" is just being entrained by transport installation $30_{II}$. Referring to FIG. 1, when winding machines 17a and 17b are in operation, one workpiece receiver 5 will always be positioned in the aforementioned first position thereof in operative relationship with transport installations 30. Receiver 5a is shown in the first position thereof in FIG. 1. The other workpiece receiver 5 will be positioned in operative relationship with the associated winding machine 17, either in a workpiece feeding position, or in a workpiece removing position wherein the receiver 5 is displaced by the width of one receiver unit further away from transport installations 30. Receiver 5b in FIG. 1 is shown in solid outline in the workpiece feeding position and in dashed outline in the workpiece removing position.

Unwound stator workpieces 24' being transported on transport installation $30_I$ are counted at each winding machine 17a and 17b by the associated counter 3. So long as a winding machine 17, e.g., machine 17a, as shown, is winding a stator workpiece, the associated workpiece receiver 5, e.g., receiver 5a, is maintained in the first position thereof, and the associated barrier 2 is actuated to allow stator workpieces 24 to pass through the workpiece receiver to the next winding machine, which passed workpieces are also counted by workpiece receiver control elements 7. When the winding of a stator 24 has been completed, barrier 2, e.g., barrier 2b, is actuated to block the passage of workpieces 24. When the last workpiece 24' to pass barrier 2b before further passage of workpieces was blocked is positioned within the associated receiver 5b (as determined, for example, when the count produced by control elements 7b equals the count produced by counter 3b), stop member piston 13b is actuated to displace stop member 12b to arrest further transport of the aforementioned last workpiece 24' by transport installation $30_I$. When the last of the workpieces downstream of the arrested workpiece 24' have passed out of receiver 5b, and receiver unit $5b_I$ thus contains only the arrested workpiece, and receiver unit $5b_{II}$ is empty, receiver displacement piston 9b is actuated to raise workpiece receiver 5b vertically from the aforesaid first positon thereof, such that the arrested workpiece 24' is disentrained from transport installation $30_I$ and supported by the set of receiver guide rails $6b_I$. Receiver displacement piston 11b is then actuated to displace receiver 5b to the aforementioned workpiece removing position wherein receiver unit $5b_{II}$ is aligned with slide member 15b. Slide member 15b is actuated to withdraw the wound stator workpiece 24" from winding machine 17b into the waiting receiver unit $5b_{II}$. When the withdrawn stator workpiece 24" is positioned within receiver unit $5b_{II}$, the corresponding stripper element 16b is actuated to separate the workpiece 24" from slide member 15b. Receiver displacement piston 11b is then actuated to displace receiver 5b to the aforementioned workpiece feeding position wherein receiver unit $5b_I$ is aligned with slide member 15b. Slide member 15b is actuated to displace the unwound stator workpiece 24' within receiver unit $5b_I$ into the previously empty stator holding device 20b. The corresponding stripper element 16b is then actuated to separate the workpiece 24' from slide member 15b as it retracts to its rest position. Receiver displacement pistons 11b and 9b are then again actuated to return receiver 5b to the aforementioned first position in operative relationship with transport installations 30, whereupon the wound stator workpiece 24" contained within receiver unit $5b_{II}$ is entrained on transport installation $30_{II}$. Then, depending on the duration of the winding cycle and the number of winding machines coupled in parallel, barrier 2b is then actuated to allow workpieces 24 to again pass through workpiece receiver 5b. The same sequence occurs in each of the winding machines 17 which are coupled in parallel, but at different times.

The apparatus of the present invention reduces the idle time of each winding machine, thereby increasing the production capacity thereof, and futher allows the transport installations to serve as storage facilities for workpieces as they travel between winding machines.

We claim:

1. Apparatus for feeding and removing stators for electrical machines to and from first and second stator winding machines coupled in parallel, said apparatus comprising:

first transport means for transporting unwound stators to said first and second winding machines;

second transport means for transporting wound stators from said first and second winding machines;

transfer means for each of said winding machines for transferring stators from said first transport means to the corresponding winding machine and from the corresponding winding machine to said second transport means, each of said transfer means comprising double stator receiver means displaceable between a first position thereof in alignment with said first and second transport means such that stators being transported by said first and second transport means can pass through said receiver means, a second position in which unwound stators are fed to and removed from the winding machine; and control means for controlling the transport of stators by at least one of said first and second transport means and the transfer of stators by each of said transfer means.

2. The apparatus of claim 1 wherein said first and second transport means comprise first and second conveyors, respectively, on which stators are entrained by their own weight, and said first and second conveyors are disposed adjacent each other at least in the vicinity of each of said winding machines; and each of said double stator receiver means comprises means defining first and second receivers for cooperating with said first and second conveyors, respectively.

3. The apparatus of claim 2 wherein said control means comprises displaceable barrier means dispoed adjacent said conveyors for selectively blocking passage of stators to the corresponding receiver means.

4. The apparatus of claim 2 wherein each of said means defining said first and second receivers comprises first and second sets of spaced guide rails oriented parallel to said first and second conveyors, respectively, said first and second sets of guide rails being aligned with said first and second conveyors, respectively, when the associated receiver means is disposed in said first position thereof and said first and second sets of guide rails supporting a stator disposed within said first and second receivers, respectively, when the associated receiver means is in a position vertically higher than or transversely displaced from said first position.

5. The apparatus of claim 2 wherein each of said transfer means comprises means for displacing said receiver means vertically and transversely with respect to said first and second transport means so as to move said transfer means into and out of operative relationship with the respective winding machine, said displacing means comprising first piston means cooperating with vertical guide means and second piston means cooperating with horizontal guide means.

6. The apparatus of claim 5 further comprising stator displacement means for each transfer means for transferring stators into and out of corresponding receiver means when the receiver means is in operative relationship with the corresponding winding machine, each of said displacement means comprising a permanent magnet for holding stators and sliding means for displacing said permanent magnet axially with respect to the corresponding receiver means.

7. Apparatus for feeding and removing workpieces to and from first and second work stations coupled in parallel, said apparatus comprising:
 a first conveyor for transporting workpieces to said first and second work stations;
 a second conveyor for transporting workpieces from said first and second work stations, said first and second conveyors being dispoed adjacent each other at least in the vicinity of each of said work stations;
 transfer means for each of said work stations for transferring workpieces from said first transport means to the corresponding work station and from the corresponding work stations to said second transport means, each of said transfer means comprising displaceable workpiece receiver means disposed in a first position thereof in alignment with said first and second transport means such that workpieces being transported by said first and second transport means can pass through said workpiece receiver means, and including first and second sets of spaced guide rails oriented parallel to said first and second conveyors, respectively, said first and second sets of guide rails being aligned with said first and second conveyors, respectively, when the associated workpiece receiver means is disposed in said first position thereof and said first and second sets of guide rails supporting a workpiece disposed within said first and second receivers, respectively, when the associated workpiece receiver means is in a position vertically higher than or transversely displaced from said first position; and
 control means for controlling the transport of workpieces by at least one of said first and second transport means and the transfer of workpieces by each of said transfer means.

8. The apparatus of claim 1 wherein unwound stators are fed to the winding machine at said second position, and wherein said receiver means are further displaceable to a third position in which would stators are removed from the winding machine.

* * * * *